US012464009B2

United States Patent
Chanivecky Garcia

(10) Patent No.: US 12,464,009 B2
(45) Date of Patent: Nov. 4, 2025

(54) MALICIOUS DOCUMENT PREVENTION MECHANISM

(71) Applicant: Fortinet, Inc., Sunnyvale, CA (US)

(72) Inventor: Karel Chanivecky Garcia, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 21 days.

(21) Appl. No.: 18/416,507

(22) Filed: Jan. 18, 2024

(65) Prior Publication Data

US 2025/0240319 A1    Jul. 24, 2025

(51) Int. Cl.
*H04L 9/40* (2022.01)
(52) U.S. Cl.
CPC ...... *H04L 63/1441* (2013.01); *H04L 63/1416* (2013.01)
(58) Field of Classification Search
CPC .......................... H04L 63/1441; H04L 63/1416
USPC ......................................................... 726/23
See application file for complete search history.

(56) References Cited

U.S. PATENT DOCUMENTS

| 9,792,131 | B1* | 10/2017 | Uchronski | G06F 9/45558 |
| 2005/0257265 | A1* | 11/2005 | Cook | G06F 21/566 |
| | | | | 726/23 |
| 2005/0257266 | A1* | 11/2005 | Cook | G06F 8/61 |
| | | | | 726/23 |
| 2015/0143374 | A1* | 5/2015 | Banga | G06F 21/00 |
| | | | | 718/1 |
| 2018/0336351 | A1* | 11/2018 | Jeffries | G06F 21/53 |
| 2019/0303584 | A1* | 10/2019 | Yang | G06F 7/02 |
| 2020/0358818 | A1* | 11/2020 | Stoletny | G06F 21/566 |
| 2023/0026368 | A1* | 1/2023 | Silverstein | G06F 16/986 |
| 2025/0039161 | A1* | 1/2025 | Gangadharappa | H04L 63/08 |

* cited by examiner

*Primary Examiner* — Badrinarayanan
(74) *Attorney, Agent, or Firm* — Jaffery Watson Hamilton & DeSanctis LLP

(57) ABSTRACT

A system is disclosed. The system includes at least one physical memory device and one or more processors coupled with the at least one physical memory device to receive an action indicating that a uniform resource locator (URL) may be malicious, redirect to a layered frame isolation (LFI) page within a browser, wherein the LFI comprises an extension page in the browser to provide isolation for the URL and display the LFI page.

20 Claims, 7 Drawing Sheets

MALICIOUS DOCUMENT PREVENTION MECHANISM

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2024. Fortinet, Inc.

FIELD

Embodiments discussed generally relate to systems and methods for isolating potential malicious documents retrieved by a web browser.

BACKGROUND

Web pages are vectors for a multitude of network attacks, such as phishing and the download of malicious files. Additionally, a web page must first be fetched and loaded on a web browser in order to view content, at which time it may already present a vulnerability.

Hence, there exists a need in the art for enhanced systems and methods for the prevention of computing resources accessed by potentially malicious web pages.

Various embodiments provide systems and methods for rendering potentially malicious web pages while controlling resources that a malicious page may access.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A better understanding of the embodiments can be obtained from the following detailed description in conjunction with the following drawings, in which.

DETAILED DESCRIPTION

Figure 1A:
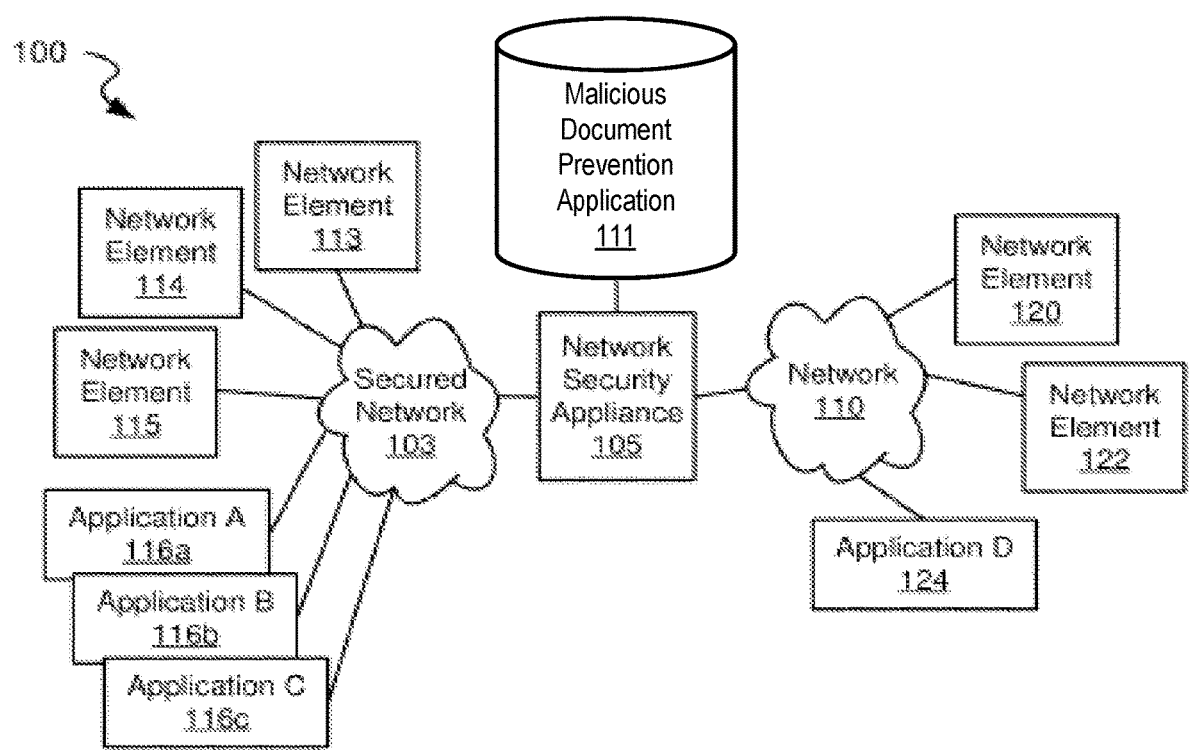
FIGS. 1A-1C illustrate embodiments of a network architecture including a malicious document prevention system.

According to one embodiment, a mechanism is provided to render potentially malicious web pages in a web browser while controlling the resources the malicious web pages may access (e.g., the ability to execute scripts, load cascading Style Sheets (CSS), download to a host file system, etc.). In such an embodiment, web pages are loaded for preview in a sandboxed frame structure referred to as layered frame isolation (LFI). In a further embodiment, an LFI is applied by an installed browser extension without modification of a browser or installing other systems.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware, and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance" or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a "network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

As used herein, a "browsing context" is an environment in which a web browser displays a document. In modern browsers, a browsing context is usually a tab, but can be a window or even only parts of a page, like a frame or an inline frame. A browsing context has an origin (e.g., that of the an document) and an ordered history of previously displayed documents.

The phrase "inline frame (iframe)" as used herein refers to a hypertext markup language (HTML) element that represents a nested browsing context that embeds another HTML page within a current document. Thus, an iframe essentially places another webpage within a parent page.

The phrase "sandbox attribute" or "sandbox" as used herein refers to an attribute that enables additional restrictions for the content in an iframe. When a sandbox attribute is present it will treat content as being from a unique origin; block form submission; block script execution; disable application program interfaces (APIs); prevent links from targeting other browsing contexts, prevent content from using plugins (e.g., <embed>, <object>, <applet>, or other); prevent the content from navigating its top-level browsing context; and block automatically triggered features (e.g., automatically playing a video or automatically focusing a form control). The value of the sandbox attribute may either be empty (then all restrictions are applied), or a space-separated list of pre-defined values that will remove the particular restrictions.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Turning to FIG. 1A, network architecture 100 is shown in accordance with some embodiments. In the context of network architecture 100, a network security appliance 105 controls access to network elements within a secured network 103. Secured network 103 may be any type of communication network known in the art. Those skilled in the art will appreciate that, secured network 103 can be a wireless network, a wired network, or a combination thereof that can be implemented as one of the various types of networks, such as an Intranet, a Local Area Network (LAN), a Wide Area Network (WAN), an Internet, and the like. Further, secured network 103 can either be a dedicated network or a shared network. The shared network represents an association of the different types of networks that use a variety of protocols, for example. Hypertext Transfer Protocol (HTTP), Transmission Control Protocol/Internet Protocol (TCP/IP), Wireless Application Protocol (WAP), and the like.

Secured network 103 provides for internetwork communications between network elements 113, 114, 115 and applications 116 (e.g., application A 116 a, application B 116 b, and application C 116 c). Network security appliance 105 operates as a gateway between secured network 103 and outside networks (e.g., a network 110). Network 110 may be any type of network known in the art. Thus, network 110 may be, but is not limited to, a wireless network, a wired network or a combination thereof that can be implemented as one of the various types of networks, such as the Internet, an Intranet, a Local Area Network (LAN), a Wide Area Network (WAN), and the like. Network security appliance 105 provides for communications between network element 113 and network element 120, network element 122, and network element 124 via network 110.

Network security appliance 105 executes a malicious document prevention application 111 that is maintained on a computer readable medium communicably coupled to network security appliance 105. Execution of malicious document prevention application 111 by network security appliance 105 causes web pages to be loaded in a LFI In one embodiment, LFI is performed by loading a web page of interest to a user into an iframe with the sandbox attribute. In such an embodiment, the sandbox attribute enables the loading of a web page to be controlled via one or more sandbox values. For example, JavaScript can be disabled as well as top-level navigation, or downloads. The web page of interest loaded in an isolated iframe may be referred to as an "LFI page".

In a further embodiment, LFI may also be implemented by injecting a content-security-policy (CSP) header with the sandbox directive, without rendering the page inside an iframe. Moreover, presentation of the page may be controlled by loading the page in the iframe, which is used to overcome limitations (e.g., the ability to run JavaScript in the page hosting the iframe). Thus, loading a page in an iframe enables additional features, such as presenting a UI that allows a user to control the sandbox capability, or preventing anchor tag navigation within an embedded frame by blocking clicking into the iframe.

In yet another embodiment, an LFI may be applied to the main frame of a page to isolate the entire content of a tab. Alternatively, an LFI may be used to isolate a portion of a page. For example, a tab rendering the legitimate uniform resource locator (URL): http://www.example.com may include an iframe with a suspicious source. Accordingly, the LFI may scope the isolation to a suspicious iframe. In one embodiment, the LFI scopes the isolation by first loading a host frame, which generates an isolation frame. Subsequently, a URL request for a sub-frame is dispatched. This subframe content is substituted (or redirected) for the LFI page. Thus, the procedure for a scoped sub-frame and a host frame are similar except for additional considerations at the time of embedding the content to isolate.

Although described above—as operating within network security appliance 105, other embodiments of malicious document prevention application 111 may be implemented within any network element operating within network 100.

Figure 1B:
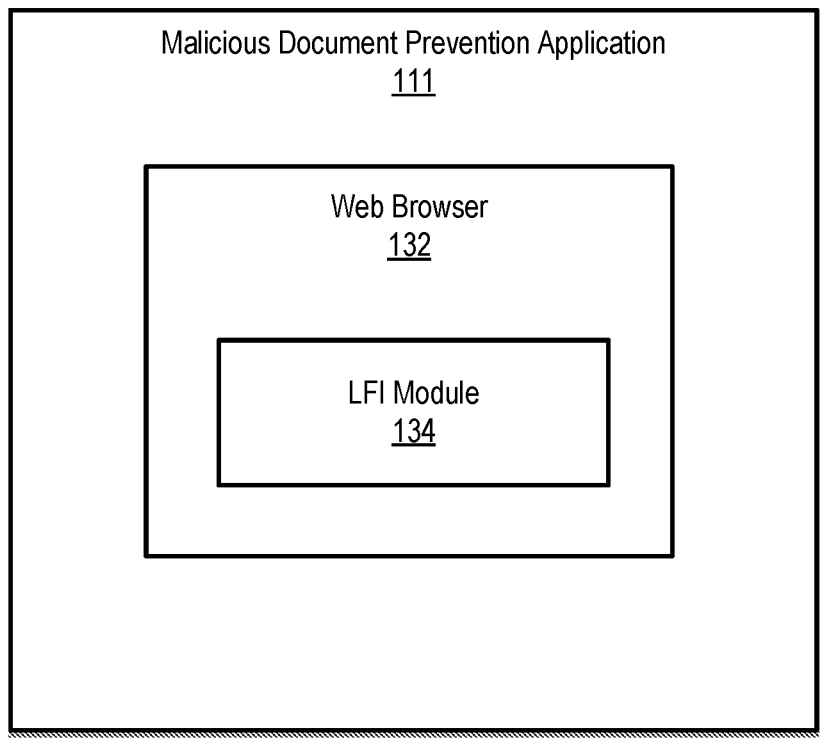

Turning to FIG. 1B, an embodiment of a malicious document prevention application 111 is illustrated. As shown, malicious document prevention application 111 includes a web browser 132, which in turn includes a LFI module 134. Web browser 132 comprises an application for accessing websites and outside networks (e.g., network 110). When a user requests a web page from a particular website, web browser 132 retrieves its files from a web server and then displays the page on a user's screen. LFI module 134 is implemented to load web pages within an LFI in web browser 132.

Figure 1C:
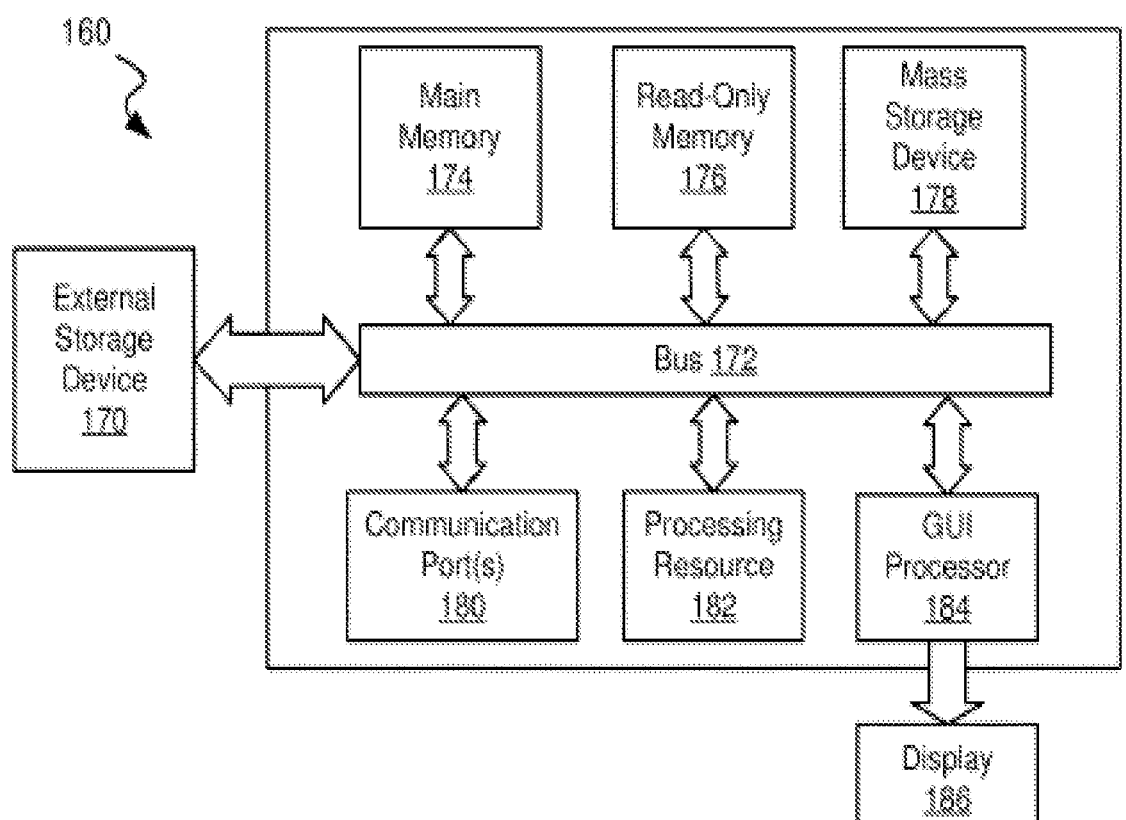

Turning to FIG. 1C, an example computer system 160 is shown in which or with which embodiments of the present disclosure may be utilized. As shown in FIG. 1C, computer system 160 includes an external storage device 170, a bus 172, a main memory 174, a read-only memory 176, a mass storage device 178, one or more communication ports 180, one or more processing resources (e.g., processing circuitry 182), and a graphical user interface (GUI) processor 184. GUI processor 184 drives a display 186. In one embodiment, computer system 160 may represent some portion of any of network security appliance 105.

Those skilled in the art will appreciate that computer system 160 may include more than one processing resource 182 and communication port 180. Non-limiting examples of processing resources include, but are not limited to. Intel Quad-Core, Intel i3, Intel 15. Intel 17. Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage device 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external. e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs. Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI). USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM). Compact Disc Rewritable (CD-RW), Digital Video Disk Read Only Memory (DVD-ROM). Components described above are meant only to show various possibilities. In no way should the aforementioned example computer systems limit the scope of the present disclosure.

Figure 2:
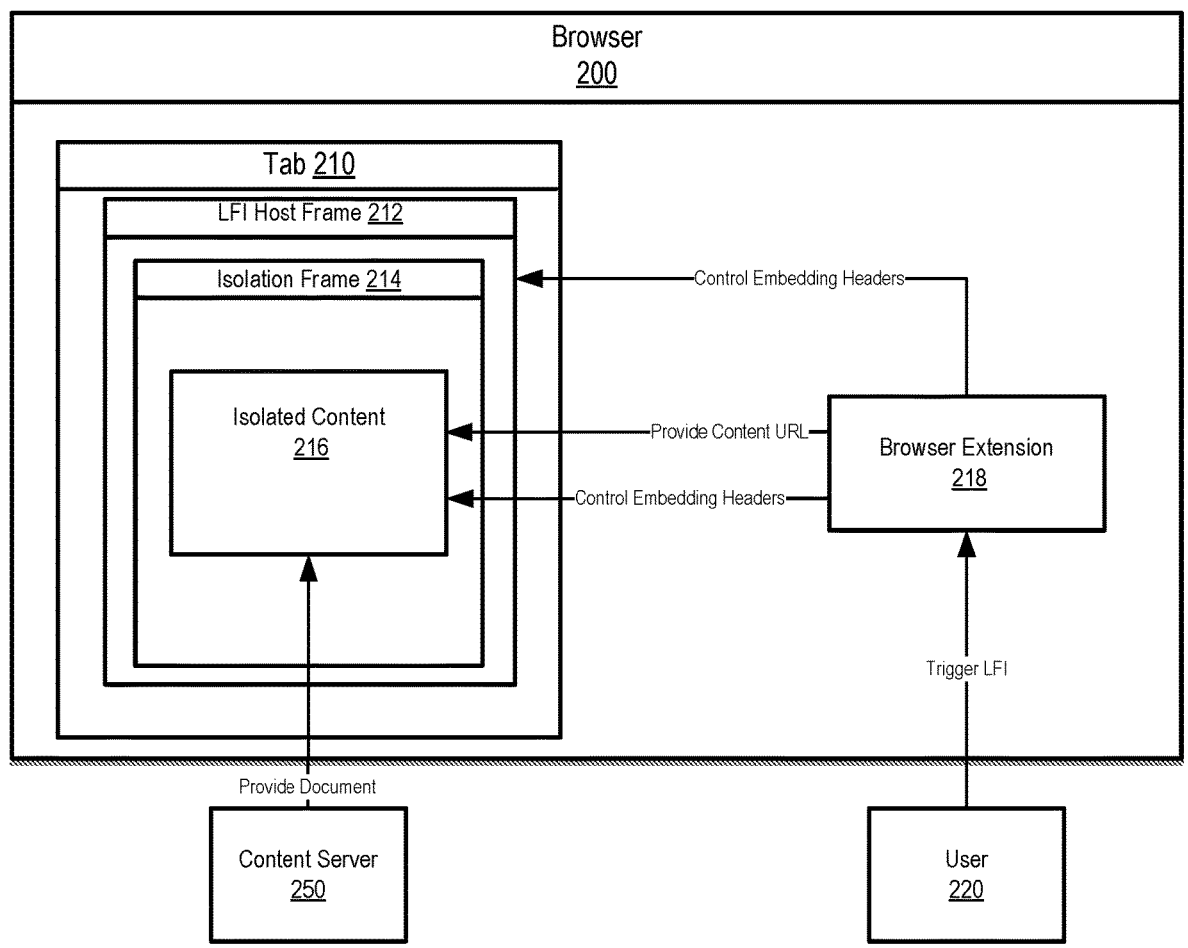
FIG. 2 illustrates one embodiment of a layered frame isolation architecture.

FIG. 2 illustrates one embodiment of a LFI architecture. As shown in FIG. 2, a browser 200 includes a browser tab 210 and browser extension (or extension) 218. According to one embodiment, browser 200 renders an LFI page and executes an LFI extension. In this embodiment, browser 200 includes a LFI host frame 212 included within a browser tab 210. LFI host frame 212 comprises the frame upon which the LFI is generated. In a further embodiment, the frame may be a main frame or a sub-frame of a browser tab. As used herein, a frame comprises a component of a browser window that may independently display content.

An isolation frame 214 is located within LFI host frame 212. LFI host frame 212 comprises the location at which isolated content 216 associated with an LFI page is rendered. Browser extension 218 enables the loading of content to embed headers within isolation frame 214. In one embodiment, the action of a user 220 received at browser extension 218 may trigger an LFI page. In response, browser extension 218 controls the embedding of headers, as well as provides the content URL. The content may then be retrieved from a content server 250.

Figure 3:
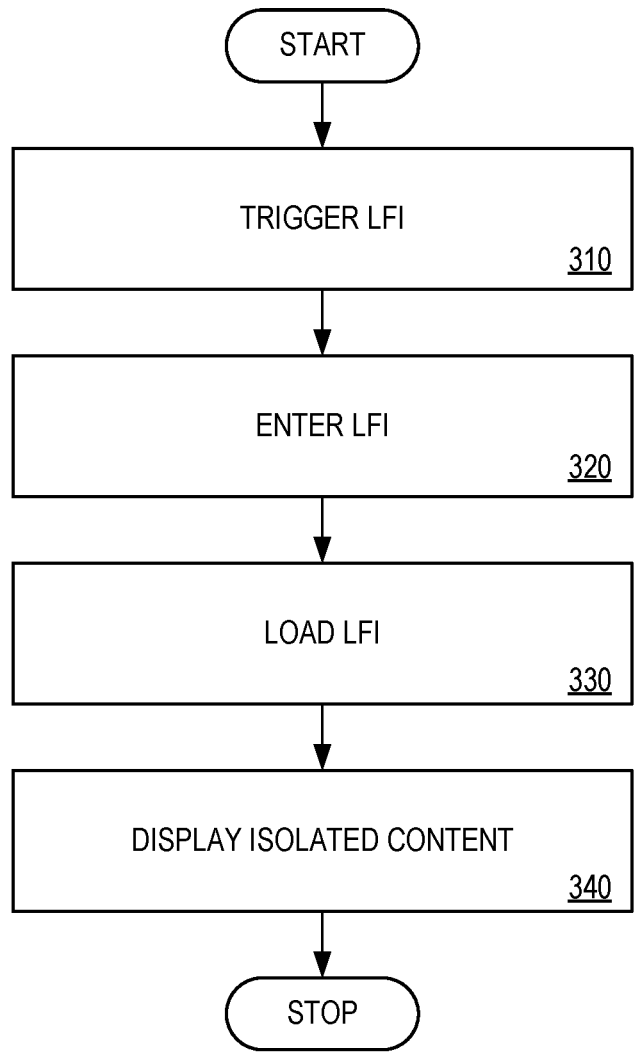
FIG. 3 is a flow diagram illustrating one embodiment of a process for implementing a layered frame isolation mechanism.

FIG. 3 is a flow diagram illustrating one embodiment of a process for implementing a LFI within browser 200. At processing block 310, a LFI page is triggered by a user. In one embodiment, a triggering comprises an action indicates that a URL may be malicious. In such an embodiment, a triggering action may comprise a user submitting a form to isolate a provided URL, or via a navigation request (e.g., selecting a hyperlink) to browser 200. In the case of a navigation request being the trigger, browser extension 218 intercepts and evaluates requests. For example, if the user wants to navigate to http://www.example.com, browser 200 notifies extension 218 of the user request and redirects to the LFI page where the requested page is loaded as isolated content in isolation frame 214.

Once triggered, the LFI is entered after it has been triggered, processing block 320. In one embodiment, entering the LFI comprises a request identifier being stored. In such an embodiment, the request identifier comprises the user requested URL, as well as tab and frame information at which the request was meant to be loaded. The tab and frame information are later used to retrieve the requested URL from browser extension 218.

Subsequently, LFI host frame 212 is requested to load the LFI page. As discussed above, the LFI page is the content loaded in LFI host frame 212. Thus, the LFI page is effectively an extension page that provides the structure upon which to perform the isolation. Additionally, headers of the LFI host frame 212 are modified to enable loading of the LFI page. This modification occurs since the LFI page is meant to load in a sub-frame of a page (e.g., the host page) that specifies valid frame sources that exclude the LFI page.

After entering the LFI page, the LFI page is loaded, processing block 330. In one embodiment, loading the LFI page comprises loading any supporting user interface (UI) features at the same time that it retrieves the URL to load in isolation. In a further embodiment, the URL may be passed to the page using URL parameters or by communicating with browser extension 218. Once received, the URL is set as a source in an isolation iframe (e.g., isolation frame 214)

At this point, browser 200 dispatches a request to fetch the URL to isolate that will be detected by browser extension 218. In one embodiment, browser extension 218 is configured to determine that the URL is loading within the LFI page this time so as not to enter an infinite loop of redirection into the LFI page. After allowing the request to proceed, a challenge arises. The URL to isolate may respond with headers that prevent it from being embedded within the LFI page. Thus in embodiments, the response headers are modified to remove any header that would preclude embedding. However in further embodiments, the URL to isolate is not allowed to be embedded into the LFI page upon a determination that it would not be allowed to be loaded in the page in the case that LFI was not applied. For example, suppose that the origin of the page is www.example.com. Then suppose the URL to isolate is http://www.notexample.com (a different origin) and the resource is served with HTTP headers that only allow embedding in the same origin. Normally, LFI would force the embedding of the URL to isolate itself, however, in this case the origin of the page and the origin of the URL to isolate do not match and only same origin embedding is allowed. In this case, the LFI must not force embedding. After embedding of the isolated URL is complete, the procedure has finished. Subsequently, the isolated content may be displayed, processing block 340.

Figure 4:
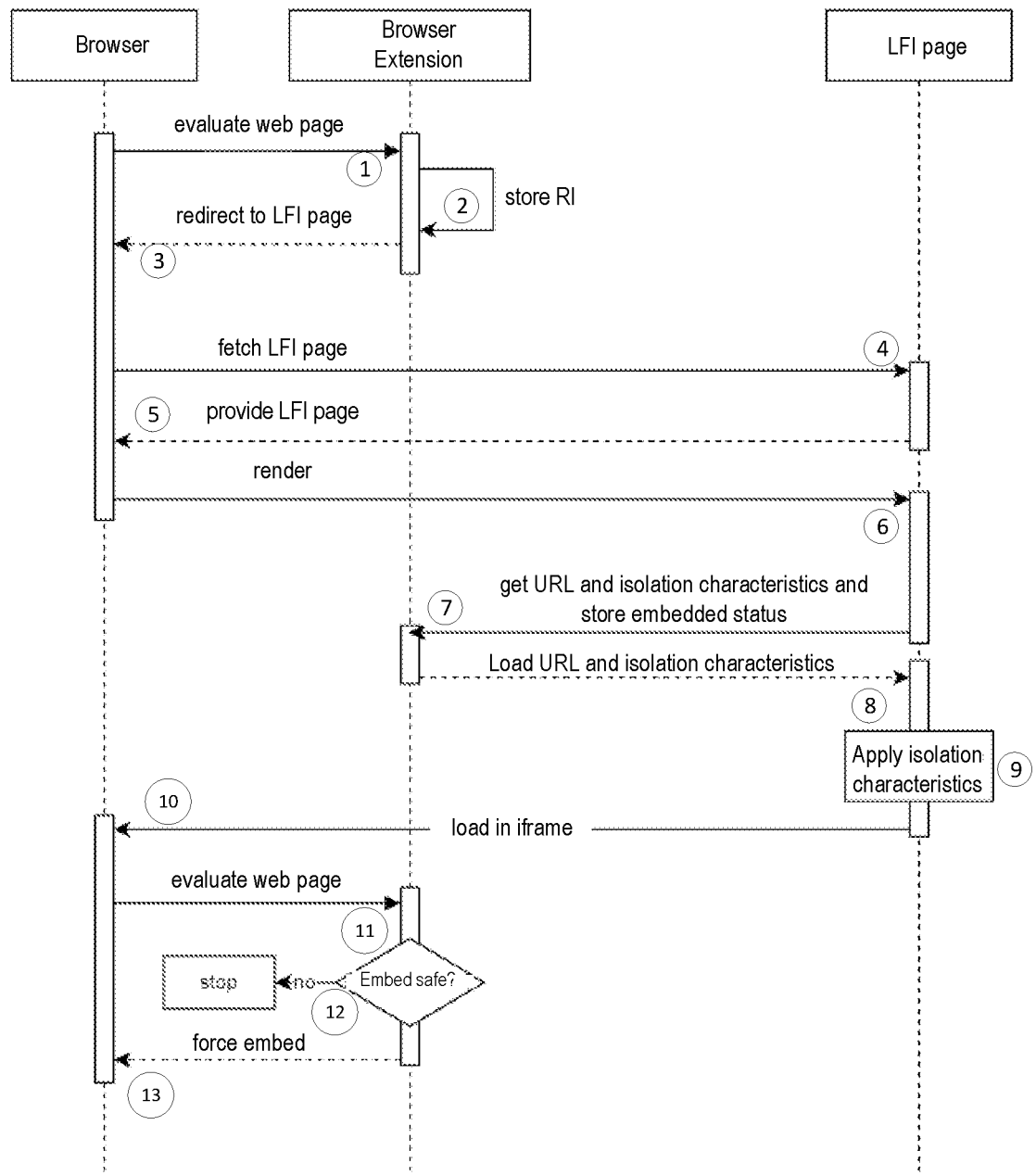
FIG. 4 is a sequence diagram illustrating one embodiment of a layered frame isolation process.

FIG. 4 is a sequence diagram illustrating one embodiment of a LFI process. At stage 1, the browser extension receives a web page to be evaluated from the browser. At stage 2, the browser extension stores a request identifier associated with the web page. As discussed above, the request identifier comprises a user requested URL, and tab and frame information at which the request was to be loaded. At stage 3, the browser extension transmits the request identifier to the browser to redirect the browser to an LFI page.

At stage 4, the browser loads the LFI page from the source at which it is loaded (e.g., as indicated by the request identifier). At stage 5, the LFI page is returned to the browser. At stage 6, the browser renders the LFL page. At stage 7, the LFI page transmits a request identifier to the browser extension to retrieve the URL the LFI page is to load, and any isolation characteristics that are to be applied. Additionally, the embedded status is stored.

At the time of redirecting a request to the LFI page, the browser extension is able to determine the specific tab and frame information. However, the LFI page has not been rendered at this point. AN LFI page may be deemed to have loaded once the request for the URL and isolation characteristics have been received. At this time, the same information is available, but with the difference that now it includes an LFI page. This information can later be used in the "embed safe" operation.

At stage 8, the URL and isolation characteristics are loaded. At stage 9, the isolation characteristics are applied. In one embodiment, the isolation characteristics comprise attributes that are to be implemented by the iframe to isolate the content that is to be loaded. Such attributes may include those indicating that JavaScripts are not to be executed, forms are not to be allowed, etc. At stage 10, the LFI page generates an iframe (e.g., isolation frame 214) and instructs the iframe to navigate to the URL. Additionally, the LFI page specifies the isolation characteristics to the iframe. At this stage, the browser retrieves the web page from the content server addressed by the URL. Thus at stage 11, the browser extension evaluates the web page to determine whether it is safe to download the content from the URL to the iframe. In one embodiment, a web page is considered safe based on an evaluation of various criteria. Such criteria may be illustrated by the following examples:

1. abc.com loading in xyz.com and abc.com served with CSP frame-ancestors header that excludes xyz.com;
2. abc.com loading in xyz.com and abc.com served with x-frame-options header set to same origin, or refuse to embed;
3. abc.com loading in xyz.com and Cross-Origin-Resource-Policy header is present and not set to cross-origin; and
4. abc.com loading in xyz.com and Cross-Origin-Resource-Policy header is present and set to cross-origin, but Cross-Origin-Opener-Header is present and NOT set to unsafe none.

At stage 12, the process is stopped upon a determination that the content is not safe to download. Otherwise, an embed safe operation is performed to force embed the into the LFI page. In one embodiment, the page is embedded by removing the protections of the page so that it may be loaded into the LFI page.

Figure 5:
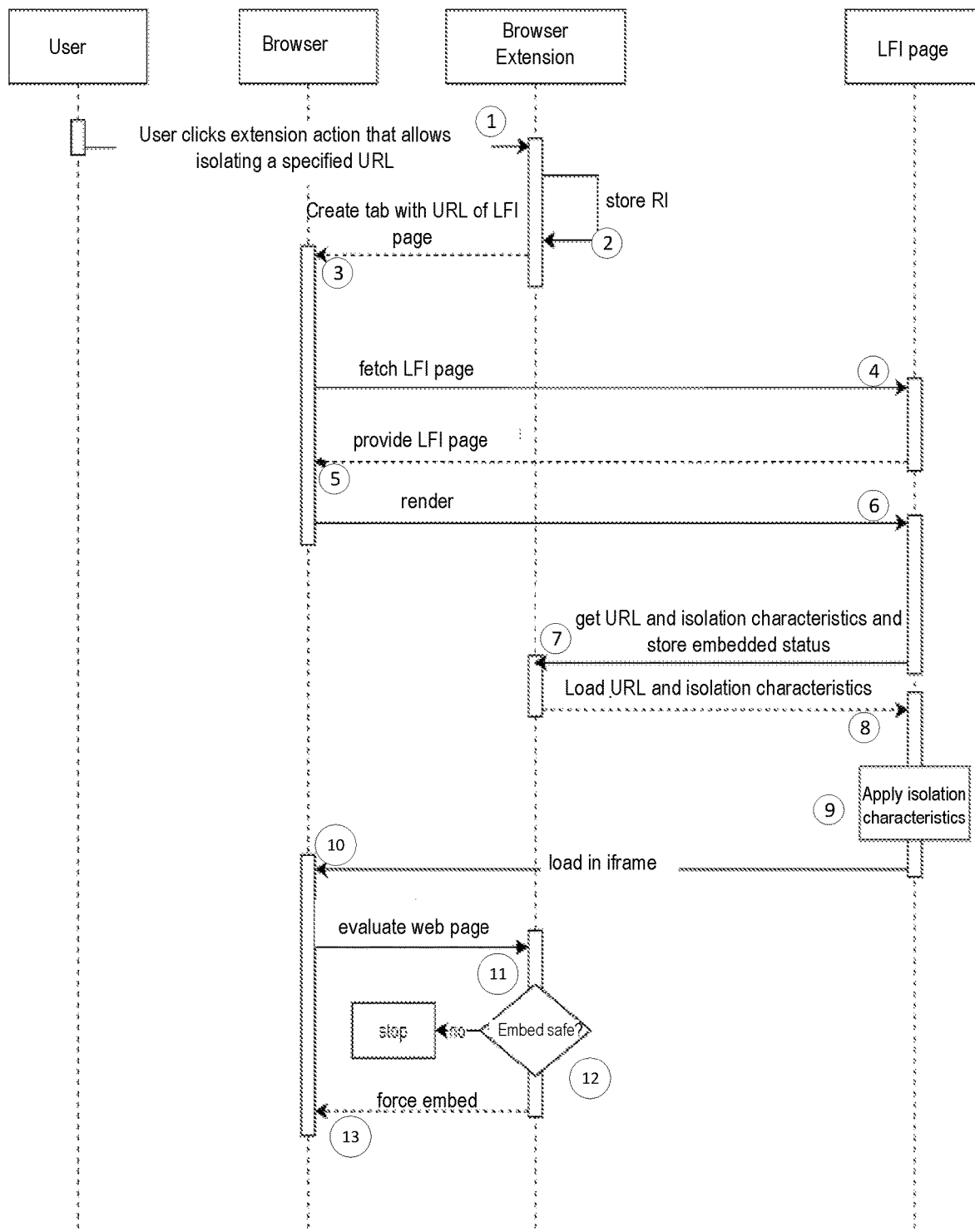
FIG. 5 is a sequence diagram illustrating another embodiment of a layered frame isolation process.

FIG. 5 illustrates another embodiment of a process in which LFI is triggered by direct user interaction. As shown in FIG. 5, the process is identical to that described above with reference to FIG. 4, with the exception of stages 1-3. At stage 1, browser extension 218 receives a user selected extension action that enables isolation of a specified URL. At stage 2, the browser extension stores the request identifier. At stage 3, the browser extension generates a tab in the browser for the LFI page based on the request identifier.

Thus, it will be appreciated by those of ordinary skill in the art that the diagrams, schematics, illustrations, and the like represent conceptual views or processes illustrating systems and methods. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing described embodiments. Those of ordinary skill in the art further understand that the exemplary hardware, software, processes, methods, and/or operating systems described herein are for illustrative purposes and, thus, are not intended to be limited to any particular named.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments, other and further embodiments may be devised without departing from the basic scope thereof. The scope of the embodiments is determined by the claims that follow. The embodiments are not limited to the described embodiments, versions or examples, which are included to enable a person having ordinary skill in the art to make and use the embodiments when combined with information and knowledge available to the person having ordinary skill in the art.

What is claimed is:

1. A system comprising:
   at least one physical memory device; and
   one or more processors coupled with the at least one physical memory device to:
      receive an action indicating that a uniform resource locator (URL) may be malicious;
      redirect to a layered frame isolation (LFI) page within a browser, wherein the LFI comprises an extension page in the browser to provide isolation for the URL;
      modify one or more headers in a host frame; and
      display the LFI page.

2. The system of claim 1, wherein redirecting to the LFI page comprises loading content associated with the URL in an isolation frame as isolated content.

3. The system of claim 2, wherein the one or more processors further enter the LFI page.

4. The system of claim 3, wherein entering the LFI page comprises storing a request identifier.

5. The system of claim 4, wherein the request identifier comprises the URL and tab and frame information at which a request was meant to be loaded.

6. The system of claim 5, wherein entering the LFI page further comprises requesting a host frame in the browser to load the LFI page.

7. The system of claim 6, wherein modifying the one or more headers in the host frame enables the LFI page to be loaded.

8. The system of claim 7, wherein the one or more processors further load the LFI page.

9. The system of claim 8, wherein loading the LFI page comprises retrieving the URL and setting the URL as a source of an isolation page within the host frame.

10. The system of claim 1, wherein the action comprises a request to navigate to URL.

11. The system of claim 1, wherein the action comprises a form to isolate the URL.

12. A method comprising:
  receiving an action indicating that a uniform resource locator (URL) may be malicious;
  redirecting to a layered frame isolation (LFI) page within a browser, wherein the LFI comprises an extension page in the browser to provide isolation for the URL;
  modifying one or more headers in a host frame; and
  displaying the LFI page.

13. The method of claim 12, wherein redirecting to the LFI page comprises loading content associated with the URL in an isolation frame as isolated content.

14. The method of claim 13, further comprises:
  entering the LFI page; and
  loading the LFI page.

15. The method of claim 14, wherein entering the LFI page comprises:
  storing a request identifier; and
  requesting a host frame in the browser to load the LFI page.

16. The method of claim 15, wherein loading the LFI page comprises:
  retrieving the URL; and
  setting the URL as a source of an isolation page within the host frame.

17. At least one non-transitory computer readable medium having instructions stored thereon, which when executed by one or more processors, cause the processors to:
  receive an action indicating that a uniform resource locator (URL) may be malicious;
  redirect to a layered frame isolation (LFI) page within a browser, wherein the LFI comprises an extension page in the browser to provide isolation for the URL;
  modify one or more headers in a host frame; and
  display the LFI page.

18. The computer readable medium of claim 17, having instructions stored thereon, which when executed by one or more processors, further cause the processors to:
  enter the LFI page; and
  load the LFI page.

19. The computer readable medium of claim 18, wherein entering the LFI page comprises:
  storing a request identifier;
  requesting a host frame in the browser to load the LFI page.

20. The computer readable medium of claim 19, wherein loading the LFI page comprises:
  retrieving the URL; and
  setting the URL as a source of an isolation page within the host frame.

* * * * *